H. Disston.
Saw-Set.
No. 70,423. Patented Nov. 5, 1867.
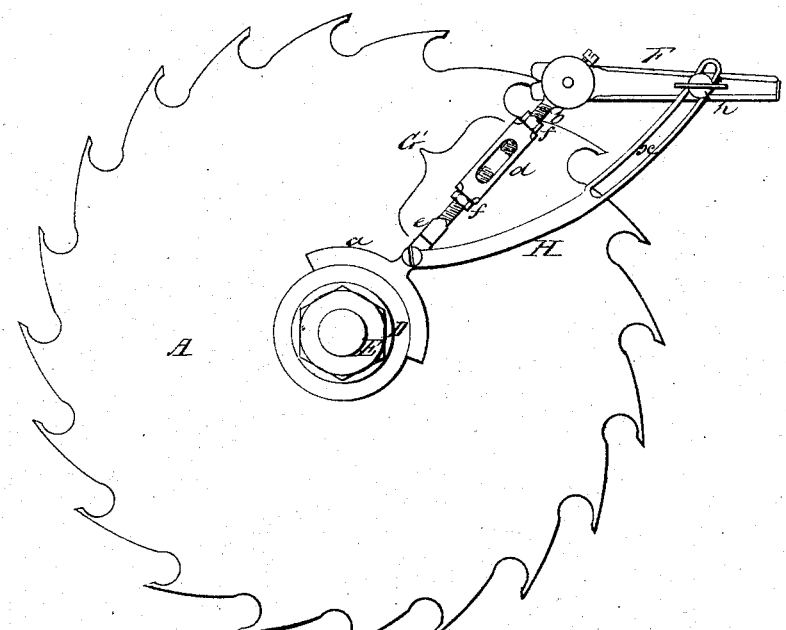
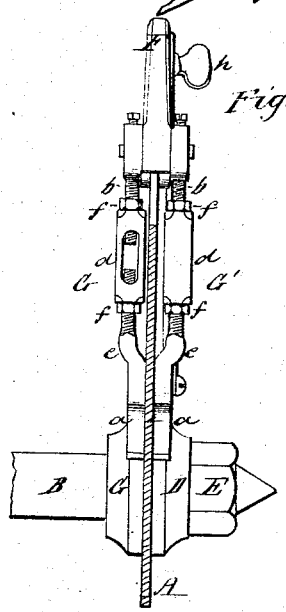
Witnesses
Rowbotham
John Parker
Inventor
H. Disston
By his Atty
J. H. Howson

United States Patent Office.

HENRY DISSTON, OF PHILADELPHIA, PENNSYLVANIA.

Letters Patent No. 70,423, dated November 5, 1867.

---

IMPROVED DEVICE FOR SETTING SAW-TEETH.

---

The Schedule referred to in these Letters Patent and making part of the same.

---

TO ALL WHOM IT MAY CONCERN:

Be it known that I, HENRY DISSTON, of Philadelphia, Pennsylvania, have invented an Improved Instrument for Setting the Teeth of Circular Saws; and I do hereby declare the following to be a full, clear, and exact description of the same.

My invention consists of a notched swage hinged to rods which are so adapted to and controlled by the collars, washers, or spindle of a circular saw, that the cutting edges of all the teeth of the latter when set by the swage must be at the same distance from the centre of the saw.

In order to enable others skilled in the art to make and use my invention, I will now proceed to describe its construction and operation, reference being had to the accompanying drawing, which forms a part of this specification, and in which—

Figure 1 is a side view of my instrument for setting the teeth of circular saws.

Figure 2, an end view of the same.

The blade A, spindle B, collar C, washer D, and nut E of a circular saw are represented in red lines. F represents the swage, having at one end an angular recess or notch adapted to the shape of the cutting edges of the teeth to be set. To this swage are hinged two rods, G and G', one on each side of the swage and blade, the rods terminating at their lower ends in segments $a$ $a$ adapted to the peripheries of the collars or washers of the saw. Each rod is composed of three parts, namely, the upper portion $b$ hinged to the swage, the screw-coupling $d$, and the lower portion $e$, of which the above-mentioned segment forms a part, there being in addition the usual tightening-nuts $f$ $f$. The portions $b$ and $e$ have such screw-threads adapted to similar thread, in the coupling that by turning the latter in one direction the rod will be shortened, and in the opposite direction lengthened. To one of the rods G is hinged one end of a curved bar, H, which has near its opposite end a curved slot, $x$, the stem of a thumb-screw, $h$, passing through the latter into the swage F. It is well known to those familiar with the construction and operation of a circular saw that the cutting edges of all the teeth should be at the same distance from the centre of the saw. In using the ordinary setting tools the desired accuracy in this respect cannot always be attained, as the position in which they are held while being struck by the hammer depends upon the judgment of the operator.

The cutting edges of all the teeth set by the above-described instrument must of necessity be at the same distance from the centre of the saw, as the position of the angular notch in the swage is controlled by the collar and washer C and D and rods G and G'.

The proper set of one tooth having been determined, the rods are adjusted accordingly by turning the couplings $d$, and the swage is adjusted to the desired angle, after which it is secured by the thumb-screw $h$. As tooth after tooth is operated on by striking the swage, the latter will impart the desired set, at the same time slightly bending the cutting edge of each tooth upward or downward, if its cutting edge is not already at the same distance from the centre of the saw as the first tooth operated on, consequently the saw, when the setting of the teeth has been completed, must of necessity be true and concentric with the collar and washer. The lower ends of the rods may be adapted to the spindle of the saw, instead of to the collars or washer, and instead of being made segmental may be so constructed as to embrace either the collars or the spindle.

Without confining myself to the precise mode herein described of rendering the rods adjustable as regards their length, I claim as my invention, and desire to secure by Letters Patent—

The notched swage F, in combination with adjustable rods G and G', the lower ends of which are adapted to or arranged to embrace the collar and washer or the spindle of a circular saw, all substantially as and for the purpose herein set forth.

In testimony whereof I have signed my name to this specification in the presence of two subscribing witnesses.

HENRY DISSTON.

Witnesses:
   A. H. SHOEMAKER,
   WM. M. BILLMEYER.